(12) United States Patent
Whittle (10) Patent No.: US 11,608,162 B2
(45) Date of Patent: Mar. 21, 2023

(54) AIRCRAFT WHEEL TORQUE BAR SPACER

(71) Applicant: GOODRICH CORPORATION, Charlotte, NC (US)

(72) Inventor: Scott Whittle, Springboro, OH (US)

(73) Assignee: Goodrich Corporation, Charlotte, NC (US)

( * ) Notice: Subject to any disclaimer, the term of this patent is extended or adjusted under 35 U.S.C. 154(b) by 52 days.

(21) Appl. No.: 17/243,251

(22) Filed: Apr. 28, 2021

(65) Prior Publication Data
US 2021/0387720 A1 Dec. 16, 2021

Related U.S. Application Data

(60) Provisional application No. 63/037,387, filed on Jun. 10, 2020.

(51) Int. Cl.
*B64C 25/42* (2006.01)

(52) U.S. Cl.
CPC .................................. *B64C 25/42* (2013.01)

(58) Field of Classification Search
CPC ....................................................... B64C 25/42
See application file for complete search history.

(56) References Cited

U.S. PATENT DOCUMENTS

| | | | |
|---|---|---|---|
| 4,382,493 A | 5/1983 | Warre, Sr. | |
| 5,024,297 A * | 6/1991 | Russell | F16D 65/84 188/264 G |
| 7,488,044 B2 * | 2/2009 | Scelsi | B64C 25/36 301/6.2 |
| 8,157,062 B2 * | 4/2012 | Enright | F16D 65/78 188/71.6 |
| 8,668,276 B2 | 3/2014 | Hall et al. | |
| 2007/0215894 A1 * | 9/2007 | Lee | H01L 33/486 257/E33.072 |

FOREIGN PATENT DOCUMENTS

| | | |
|---|---|---|
| EP | 3611144 | 2/2020 |
| KR | 20070095145 | 9/2007 |
| WO | 2009082397 | 7/2009 |

OTHER PUBLICATIONS

European Patent Office, European Search Report dated Nov. 23, 2021 in Application No. 21178169.5.

* cited by examiner

*Primary Examiner* — Tye William Abell
(74) *Attorney, Agent, or Firm* — Snell & Wilmer L.L.P.

(57) ABSTRACT

A torque bar assembly for use in an aircraft wheel is disclosed. In various embodiments, the assembly includes a torque bar; and a spacer configured for positioning between the torque bar and a wheel well of the aircraft wheel and to thermally insulate the wheel well from the torque bar, wherein the spacer includes a first anodized metal oxide layer on a first surface of the spacer configured to contact the torque bar. In various embodiments, the spacer includes a second anodized metal oxide layer on a second surface of the spacer configured to contact the wheel well.

19 Claims, 5 Drawing Sheets

AIRCRAFT WHEEL TORQUE BAR SPACER

CROSS-REFERENCE TO RELATED APPLICATIONS

This application claims priority to, and the benefit of, U.S. Provisional Patent Application No. 63/037,387, filed Jun. 10, 2020 and titled "AIRCRAFT WHEEL TORQUE BAR SPACER," which is incorporated herein by reference in its entirety for all purposes.

FIELD

The present disclosure relates to aircraft wheel and brake systems and, more particularly, to torque transmitting bars—or torque bars—fastened to a radially inner surface of a wheel well for engagement with a plurality of brake rotors.

BACKGROUND

Aircraft typically utilize brake systems or mechanisms on wheels to slow or stop the aircraft during landings, taxiing and emergency situations, such as, for example, a rejected takeoff (RTO), which generally refers to application of a brake mechanism during an aborted takeoff and involves high braking loads over a short time period, resulting in a rapid increase in the brake temperature. A brake mechanism generally employs a heat sink comprising a series of friction disks, sandwiched between a pressure plate and an end plate, that may be forced into sliding contact with one another during a brake application to slow or stop the aircraft. Under various conditions, such brake applications may generate high temperatures and frictional loads throughout the heat sink and particularly on the surfaces of the stators and rotors and the pressure plate and the end plate that comprise the heat sink.

Torque bars—also known as torque transmitting bars, lugs or beams—are employed in aircraft wheel and brake systems to couple the wheels to the rotors of the brake mechanism. A torque bar typically extends parallel to a central axis extending through a wheel axle and has an outboard end inserted into an aperture formed in a web of the wheel and an inboard end attached to a radially inner side of the wheel at the inboard end of the wheel. The inboard end of the torque bar may be attached to the wheel by a fastener, such as, for example, a bolt, that extends in a direction that is generally perpendicular to the central axis. To minimize thermal conduction from the brake mechanism to the wheel rim, the inboard and central portions of the torque bar may be spaced in a radial direction from the well of the wheel, creating an annular space configured to house a heat shield.

SUMMARY

A torque bar assembly for use in an aircraft wheel is disclosed. In various embodiments, the assembly includes a torque bar; and a spacer configured for positioning between the torque bar and a wheel well of the aircraft wheel and to thermally insulate the wheel well from the torque bar, wherein the spacer includes a first anodized metal oxide layer on a first surface of the spacer configured to contact the torque bar. In various embodiments, the spacer includes a second anodized metal oxide layer on a second surface of the spacer configured to contact the wheel well.

In various embodiments, the first anodized metal oxide layer and the second anodized metal oxide layer have a porosity less than about fifty percent. In various embodiments, the porosity is less than about twenty percent. In various embodiments, the first anodized metal oxide layer and the second anodized metal oxide layer have a thickness greater than about twenty micrometers. In various embodiments, the thickness is greater than about fifty micrometers. In various embodiments, the first anodized metal oxide layer and the second anodized metal oxide layer have a thermal resistance greater than about one-half degree Kelvin per Watt. In various embodiments, the thermal resistance is greater than about two degrees Kelvin per Watt. In various embodiments, the spacer comprises titanium or a titanium alloy. In various embodiments, the first anodized metal oxide layer is a titanium oxide layer.

A wheel and brake assembly is disclosed. In various embodiments, the assembly includes a wheel well, the wheel well being generally cylindrical and coaxial with respect to a rotational axis of the wheel; a torque bar connected to the wheel well and the brake assembly; and a spacer disposed between the wheel well and the torque bar, wherein the spacer includes a first anodized metal oxide layer on a first surface of the spacer configured to contact the torque bar. In various embodiments, the spacer includes a second anodized metal oxide layer on a second surface of the spacer configured to contact the wheel well.

In various embodiments, the first anodized metal oxide layer and the second anodized metal oxide layer have a porosity less than about fifty percent. In various embodiments, the porosity is less than about twenty percent. In various embodiments, the first anodized metal oxide layer and the second anodized metal oxide layer have a thickness greater than about twenty micrometers. In various embodiments, the thickness is greater than about fifty micrometers. In various embodiments, the first anodized metal oxide layer and the second anodized metal oxide layer have a thermal resistance greater than about one-half degree Kelvin per Watt. In various embodiments, the thermal resistance is greater than about two degrees Kelvin per Watt. In various embodiments, the spacer comprises titanium or a titanium alloy. In various embodiments, the first anodized metal oxide layer is a titanium oxide layer.

The foregoing features and elements may be combined in various combinations, without exclusivity, unless expressly indicated herein otherwise. These features and elements as well as the operation of the disclosed embodiments will become more apparent in light of the following description and the accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of elucidation and not of limitation. Furthermore, any reference to the singular includes plural embodiments, and any reference to more than one component or step may include a singular embodiment or step. Likewise, references to "a," "an" or "the" may include one item or more than one item and such reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. As used herein, "distal" refers to a direction outward, or generally away, from a reference component and "proximal" or "proximate" refer to a direction inward, or generally, towards the reference component. All ranges may include upper and lower values and all ranges and ratio limits disclosed herein may be combined. Further, the term "about" is intended to include a degree of error associated with measurement of a particular quantity based upon equipment or techniques otherwise available at the time of filing the application. For example, "about" may include a range of ±5% or 2% of a given value.

Figure 1A:
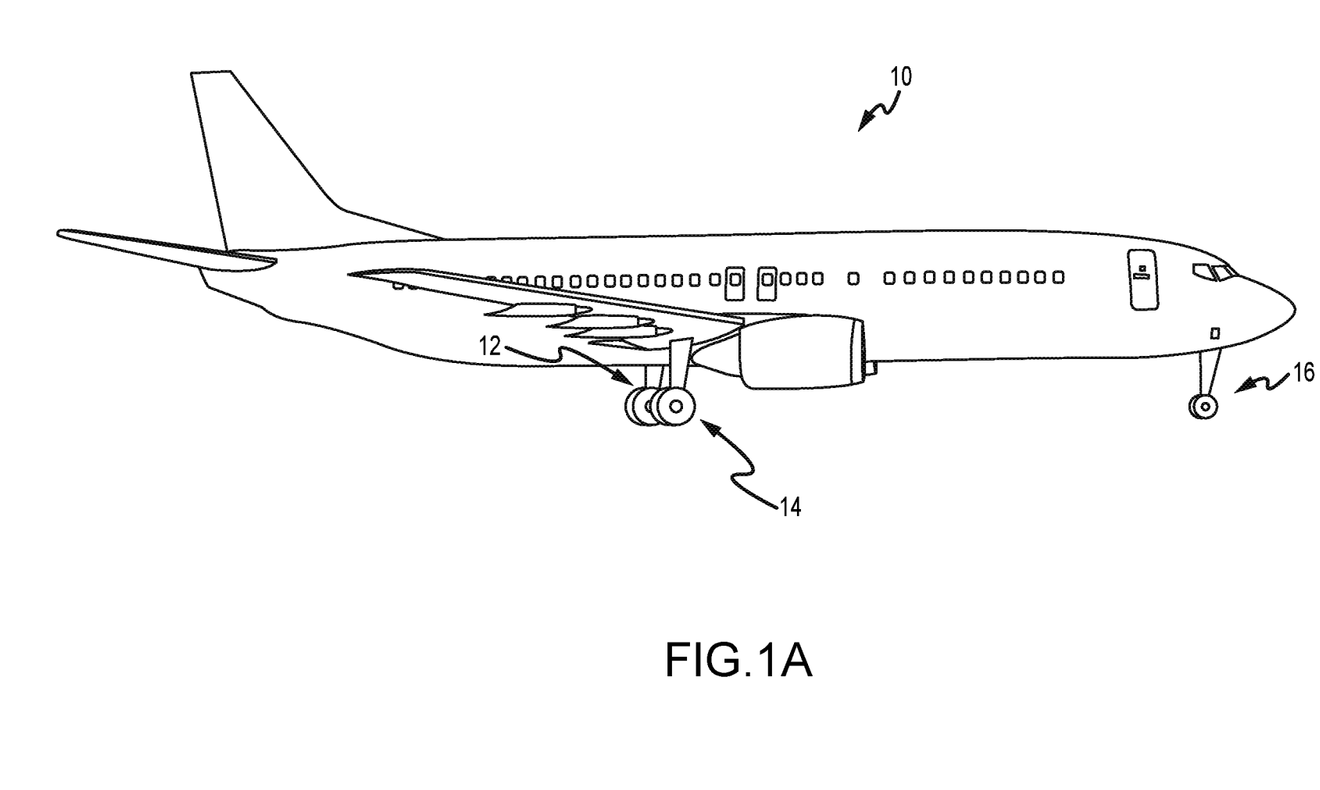
FIG. 1A illustrates an exemplary aircraft having a brake system, in accordance with various embodiments.
Figure 1B:
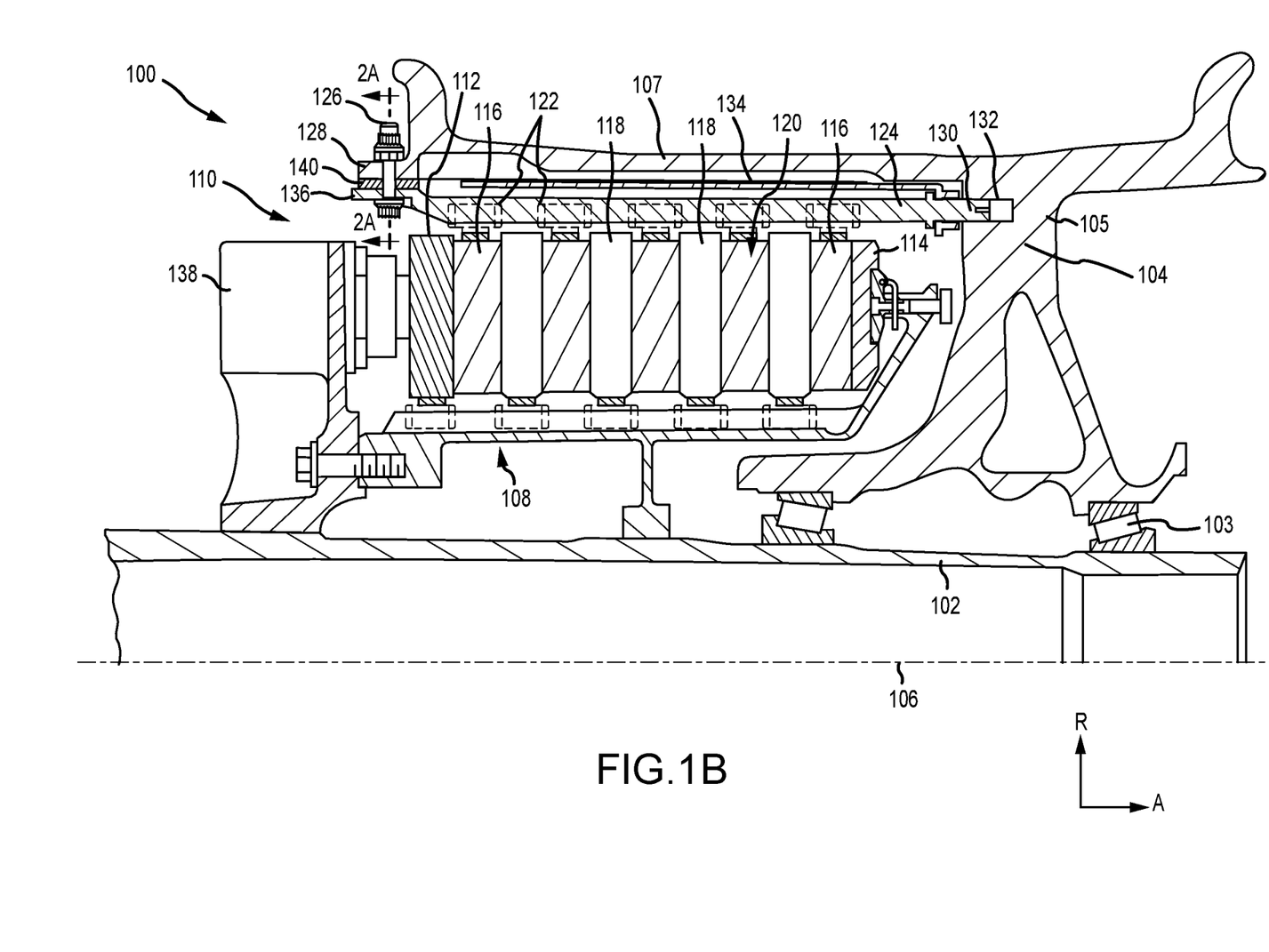
FIG. 1B illustrates a cross-sectional view of a brake mechanism, in accordance with various embodiments.

Referring now to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations. Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism 100 surrounds an axle 102 having a wheel 104 disposed thereon and configured to rotate about the axle 102 via one or more bearing assemblies 103. Typically, the wheel 104 includes a wheel web 105 and a wheel well 107, with the wheel well being generally cylindrical and coaxial with respect to a rotational axis (or a central axis 106) of the wheel. The central axis 106 extends through the axle 102 and defines a center of rotation of the wheel 104. A torque plate barrel 108 (sometimes referred to as a torque tube or barrel or a torque plate) is aligned concentrically with the central axis 106, and the wheel 104 is rotatable relative to the torque plate barrel 108. In various embodiments, the wheel 104 and the brake mechanism 100 comprise a wheel and brake assembly.

The brake mechanism 100 includes an actuator ram assembly 110, a pressure plate 112 disposed adjacent the actuator ram assembly 110, an end plate 114 positioned a distal location from the actuator ram assembly 110, and a plurality of rotor disks 116 interleaved with a plurality of stator disks 118 positioned intermediate the pressure plate 112 and the end plate 114. The pressure plate 112, the plurality of rotor disks 116, the plurality of stator disks 118 and the end plate 114 together form a brake heat sink or brake stack 120. The pressure plate 112, the end plate 114 and the plurality of stator disks 118 are mounted to the torque plate barrel 108 and remain rotationally stationary relative to the axle 102. The plurality of rotor disks 116 is mounted to the wheel 104 and rotate with respect to each of the pressure plate 112, the end plate 114 and the plurality of stator disks 118.

The plurality of rotor disks 116, interleaved between the pressure plate 112, the end plate 114 and the plurality of stator disks 118, each have a plurality of circumferentially spaced notches or slots 122 along an outer periphery of each disk for engagement with a plurality of torque bars 124 that are secured or attached to an inner periphery of the wheel 104. In various embodiments, each of the plurality of torque bars 124 is attached at an axially inboard end of the wheel 104 by a torque bar bolt 126, though other attachment locations (e.g., at the axially outboard end or intermediate the axially inboard and outboard ends) are contemplated. In various embodiments, the torque bar bolt 126 extends through a respective bolt hole in a flange 128 provided at the axially inboard end of the wheel 104, though other manners of attachment (e.g., a bolt threaded into a blind hole) are contemplated. In various embodiments, each of the plurality of torque bars 124 is also attached at an axially outboard end of the wheel 104 by a pin 130 configured to be received within a pin hole 132 that extends into the wheel web 105 of the wheel 104, though other means of attachment (e.g., via a bolt) are contemplated. In various embodiments, a heat shield 134 is disposed circumferentially about the wheel 104, between the wheel well 107 and the brake stack 120, and attached to the wheel via the pin 130 and the torque bar bolt 126, as illustrated. Disposed adjacent a mounting end 136 of each of the plurality of torque bars 124 is a spacer 140, configured to space the heat shield 134 and respective ones of the plurality of torque bars 124 from the wheel well 107 and to limit thermal conduction between the mounting end 136 of each of the plurality of torque bars 124 and the flange 128 of the wheel 104.

An actuating mechanism for the brake mechanism 100 includes a plurality of actuator ram assemblies, including the actuator ram assembly 110, circumferentially spaced around a piston housing 138 (only one actuator ram assembly is illustrated in FIG. 1B). Upon actuation, the plurality of actuator ram assemblies affects a braking action by urging the pressure plate 112 and the plurality of stator disks 118 into frictional engagement with the plurality of rotor disks 116 and against the end plate 114. Through compression of the plurality of rotor disks 116 and the plurality of stator disks 118 between the pressure plate 112 and the end plate 114, the resulting frictional contact slows or stops or otherwise prevents rotation of the wheel 104. In various embodiments, the plurality of rotor disks 116 and the plurality of stator disks 118 are fabricated from various materials, such as, for example, ceramic matrix composite materials, metallic materials (e.g., steel), carbon-fiber/carbon-matrix structures or beryllium-based alloys, that enable the brake disks to withstand and dissipate the heat generated during and following a braking action.

Figure 2A:
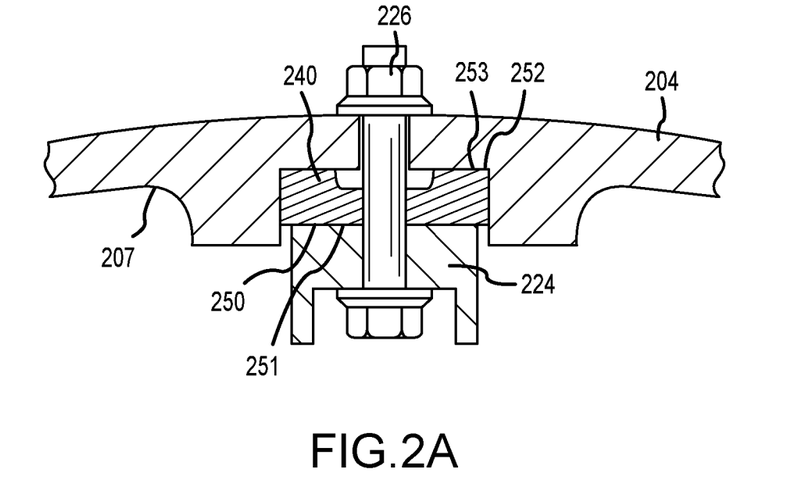
FIGS. 2A and 2B illustrate fractional views of a torque bar assembly, including a torque bar and a spacer (or a plurality of spacers) mounted to a wheel, in accordance with various embodiment.
Figure 2B:
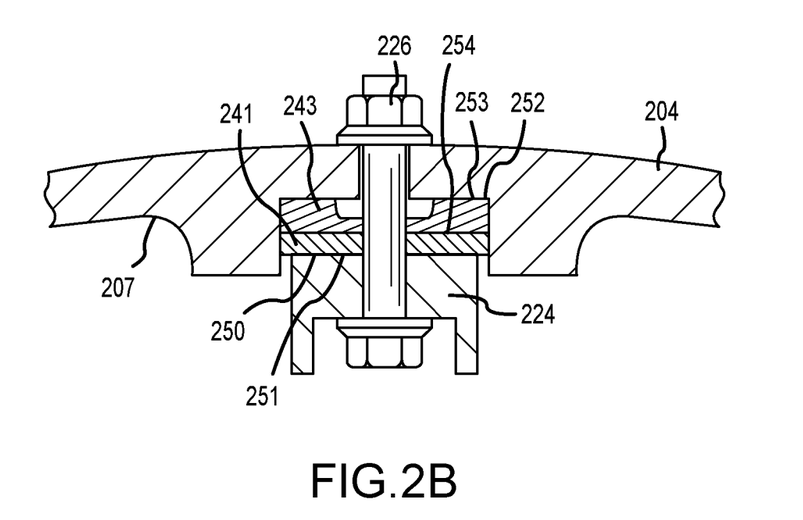

Referring now to FIGS. 2A and 2B, axial views of a section of a wheel 204 are provided, with the axial view being illustrated from the inboard end of the wheel to the outboard end. Similar to the description of the description of the brake mechanism 100 and the wheel 104 described above with reference to FIG. 1B, a torque bar 224 (from a plurality of torque bars spaced circumferentially about a radially inner surface of a wheel well 207) is attached to a radially inner surface of the wheel 204 or to the wheel well 207. As illustrated in FIG. 2A, a spacer 240 is disposed between the torque bar 224 and the wheel well 207. In various embodiments, as illustrated in FIG. 2B, a first spacer 241 and a second spacer 243 are disposed between the torque bar 224 and the wheel well 207. In various embodiments, the torque bar 224 and the spacer 240 (or the first spacer 241 and the second spacer 243) comprise a torque bar assembly.

Referring to FIG. 2A, in various embodiments, the spacer 240 includes a first anodized metal oxide layer 250 on a first surface 251 of the spacer 240 configured to contact the torque bar 224 and a second anodized metal oxide layer 252 on a second surface of the spacer 240 configured to contact the wheel well 207. Similarly, referring to FIG. 2B, the first spacer 241 includes a first anodized metal oxide layer 250 configured to contact the torque bar 224 and the second spacer 243 includes a second anodized metal oxide layer 252 configured to contact the wheel well 207. Still referring to FIG. 2B, in various embodiments, both the first spacer 241 and the second spacer 243 include an intermediate anodized metal oxide layer 254 (or a pair of intermediate anodized metal oxide layers) configured to contact each other. As described in further detail below, each of the first anodized metal oxide layer 250, the second anodized metal oxide layer 252, and the intermediate anodized metal oxide layer 254 (or the pair of intermediate anodized metal oxide layers) are configured to provide an increased resistance to thermal conduction (or an increase in the thermal resistance, typically measured in units of degrees Kelvin per Watt or K/W) across the anodized metal oxide layer than would otherwise be present at the surface of a non-anodized base metal. The increase in the thermal resistance provided by the anodized metal oxide layers is advantageous in that less thermal energy is conducted into the wheel 204 during or following a brake activation. Note that while the disclosure refers to first and second anodized metal oxide layers, the intent of such reference is to better detail the location and function of the layers (e.g., resistance to thermal conduction). Typically, a anodized component will have a single oxide layer that surrounds the entire component or, in various embodiments, multiple oxide layers surrounding the component as a result of the component being subjected to multiple anodizing processes.

Figure 3A:
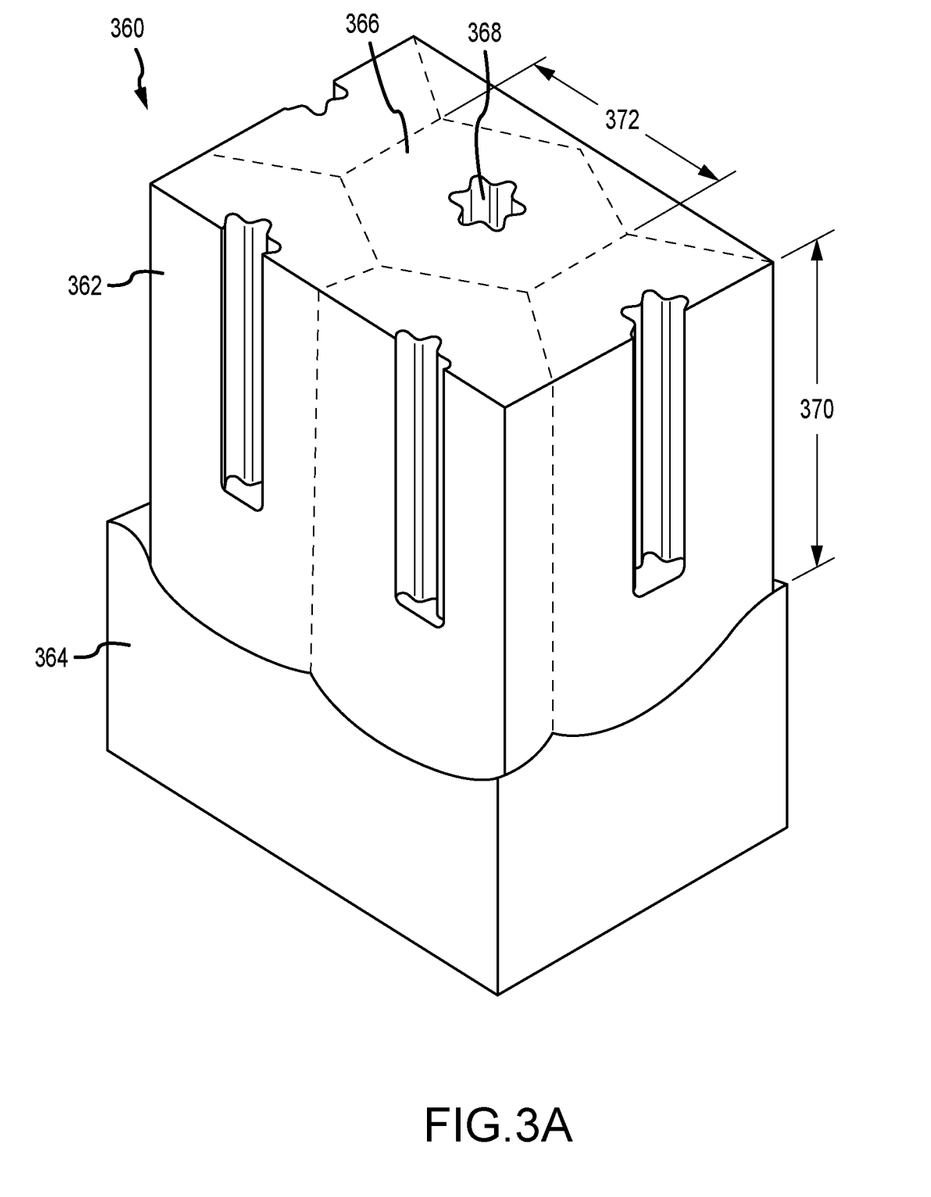
FIGS. 3A and 3B illustrate idealized depictions of an anodized component having an anodized metal oxide layer disposed on a metal base layer, in accordance with various embodiments.
Figure 3B:
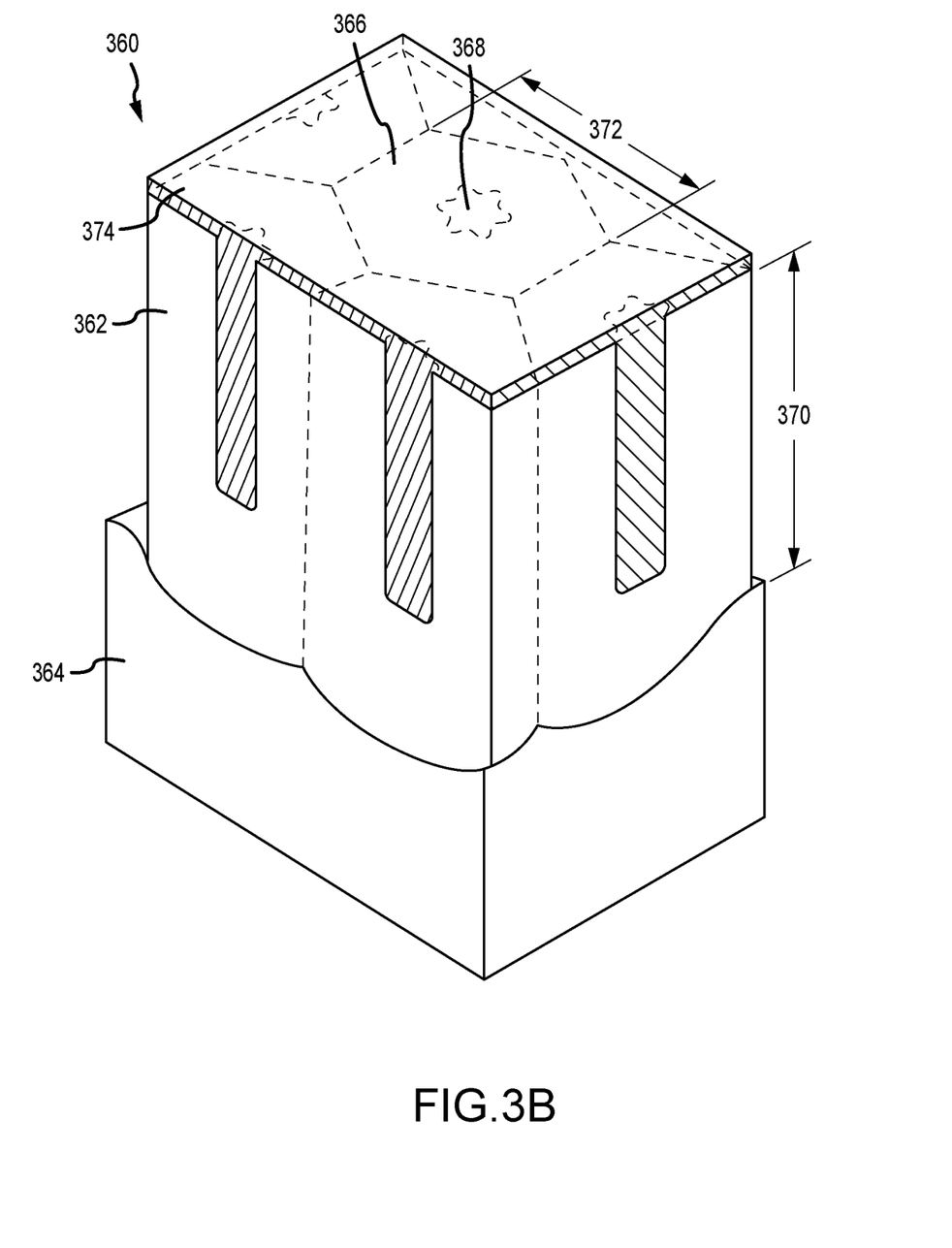

Referring now to FIGS. 3A and 3B, idealized depictions of an anodized component 360 having an anodized metal oxide layer 362 on a metal base layer 364 are provided. In various embodiments, the anodized component is representative of a spacer—e.g., the spacer 240 described above with reference to FIG. 2A or the first spacer 241 or the second spacer 243 described above with reference to FIG. 2B. Similarly, the anodized metal oxide layer 362 is representative of one or more of the first anodized metal oxide layer 250, the second anodized metal oxide layer 252 and the intermediate anodized metal oxide layer 254 described above with reference to FIGS. 2A and 2B. In various embodiments, the material comprising the metal base layer 364 is titanium or a titanium alloy and the material comprising the anodized metal oxide layer 362 is titanium oxide resulting from an anodization process. Other metallic materials are contemplated for the metal base layer 364 and the anodized metal oxide layer 362, such as, for example, aluminum or aluminum alloy and aluminum oxide, respectively.

In the idealized depiction of the anodized component 360, the anodized metal oxide layer 362 exhibits a crystalline structure, such as, for example, a hexagonal structure 366 (or a hexagonal cell) having a pore 368 at the center of each hexagonal cell. In various embodiments, and depending on the parameters of the anodization process (e.g., the electrolyte, the voltage and the elapsed time of the anodization process), the anodized metal oxide layer 362 may be defined by a thickness 370 and a characteristic cell dimension 372. In various embodiments, values for the thickness 370 may range from about twenty micrometers (20 µm) to about one-hundred micrometers (100 µm) or even greater. Similarly, the characteristic cell dimension 372 may range from about one micrometer (1 µm) or a fraction thereof (e.g., 0.3 µm) to about five micrometers (5 µm). In various embodiments, a porosity of the anodized metal oxide layer 362 may be defined by dividing a cross sectional area (or volume) of the pore 368 by a cross sectional area (or volume) of the corresponding crystalline structure (e.g., the hexagonal structure 366). In various embodiments, the porosity may range from about five percent (5%) to about fifty percent (50%). As described below, in various embodiments, the pore 368 (or the pores) may be filled with sealant to protect the anodized metal oxide layer 362 from corrosion or wear or the like.

As mentioned above, the thermal resistance of the anodized metal oxide layer 362 tends to be greater than that of the metal base layer 364, thereby providing a decrease in the thermal conductivity of the anodized component 360 (e.g., in a direction generally normal to the plane of the oxide layer) when compared against a non-anodized component comprising the same metal base material and having the same dimensions. Further, in various embodiments, the porosity within the anodized metal oxide layer 362 results in less contact area at a boundary between the anodized metal oxide layer 362 and any component that it abuts, such as, for example, one of the wheel well 207 or the torque bar 224 described above with reference to FIGS. 2A and 2B, thereby lessening the surface area for thermal conduction to occur across the boundary. In various embodiments, the increase in thermal resistance (or the decrease in thermal conductivity) is generally a function of the thickness of the anodized metal oxide layer 362. In various embodiments, for example, the thermal resistance of a titanium oxide layer may range from about one-half degree Kelvin per Watt (0.5° K/W) at a thickness 370 of about twenty micrometers (20 µm) to about two degrees Kelvin per Watt (2° K/W) at a thickness 370 of about one-hundred micrometers (100 µm). Finally, as illustrated in FIG. 3B, a coating 374 may, in various embodiments, be applied to the anodized metal oxide layer 362 in order to seal and protect the layer from wear or corrosion. The coating 374 may extend across the layer and, in various embodiments, extend into the pore 368 (or each of a plurality of pores or porous structures) as well.

The foregoing systems and methods provide a means for limiting or reducing thermal conduction from a brake stack or a heat sink into an adjoining wheel. More specifically, a reduction in the thermal conductivity of a spacer disposed between a torque bar and a wheel well is made possible by adding an anodized metal oxide layer to the spacer. The anodized metal oxide layer exhibits an increase in thermal resistance over the base metal material, thereby resulting in the decreased thermal conductivity. A further reduction in the thermal conductivity occurs because of the porous structure of the anodized metal oxide layer, leading to less surface area for thermal conduction to occur across a boundary between the spacer and an abutting torque bar or wheel well or across an abutting second spacer. Using a titanium material, such as, for example, Ti-6Al-4V titanium alloy and applying an anodized titanium oxide layer to the titanium material, the thermal conductivity of the spacer may be reduced by as much as about thirty percent (30%) with no impact on the thermal capacitance of the spacer with little increase in cost to manufacture the spacer. Additionally, a coating or sealant may be applied to the anodized titanium oxide layer to seal the porous structure, thereby improving resistance to wear or corrosion; however, if no sealant is applied following application of the anodized titanium oxide layer, then the porous structure of the layer may result in a reduction in contact area with an adjoining component of up to about fifty percent (50%). Additionally, the wear resistance between the surfaces of the spacer and the wheel well and the spacer and the torque bar may be improved as a result of the anodized titanium oxide layer being present, which also allows for further reduction in contact area through use of smaller spacers.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A torque bar assembly for use in an aircraft wheel, comprising:
    a torque bar; and
    a spacer configured for positioning between the torque bar and a wheel well of the aircraft wheel and to thermally insulate the wheel well from the torque bar, wherein the spacer includes a first anodized metal oxide layer on a first surface of the spacer configured to contact the torque bar, wherein the spacer further includes a sealant formed over the first anodized metal oxide layer on the first surface;
    wherein the spacer is a first spacer, the torque bar assembly further comprising:
    a second spacer configured for positioning between the first spacer and the wheel well of the aircraft wheel to thermally insulate the first spacer from the wheel well, wherein the second spacer includes an intermediate anodized metal oxide layer on a first surface of the second spacer configured to contact the first spacer.

2. The torque bar assembly of claim 1, wherein the spacer comprises titanium or a titanium alloy.

3. The torque bar assembly of claim 2, wherein the first anodized metal oxide layer is a titanium oxide layer.

4. The torque bar assembly of claim 1, wherein the spacer includes a second anodized metal oxide layer on a second surface of the spacer configured to contact the wheel well.

5. The torque bar assembly of claim 4, wherein the first anodized metal oxide layer and the second anodized metal oxide layer have a porosity less than fifty percent.

6. The torque bar assembly of claim 5, wherein the porosity is less than twenty percent.

7. The torque bar assembly of claim 5, wherein the first anodized metal oxide layer and the second anodized metal oxide layer have a thickness greater than twenty micrometers.

8. The torque bar assembly of claim 7, wherein the thickness is greater than fifty micrometers.

9. The torque bar assembly of claim 7, wherein the first anodized metal oxide layer and the second anodized metal oxide layer have a thermal resistance greater than one-half degree Kelvin per Watt.

10. The torque bar assembly of claim 9, wherein the thermal resistance is greater than two degrees Kelvin per Watt.

11. A wheel and brake assembly, comprising:
    a wheel well, the wheel well being substantially cylindrical and coaxial with respect to a rotational axis of the wheel;

a torque bar connected to the wheel well and the brake assembly; and a spacer disposed between the wheel well and the torque bar, wherein the spacer includes a first anodized metal oxide layer surrounding the spacer, a first side of the first anodized metal oxide layer configured to contact the torque bar;

wherein the spacer is a first spacer, the wheel and brake assembly further comprising:

a second spacer configured for positioning between the first spacer and the wheel well of the aircraft wheel to thermally insulate the first spacer from the wheel well, wherein the second spacer includes an intermediate anodized metal oxide layer on a first surface of the second spacer configured to contact the first spacer.

12. The wheel and brake assembly of claim 11, wherein the spacer comprises titanium or a titanium alloy.

13. The wheel and brake assembly of claim 12, wherein the first anodized metal oxide layer is a titanium oxide layer.

14. The wheel and brake assembly of claim 11, wherein the first anodized metal oxide layer has a porosity less than fifty percent.

15. The wheel and brake assembly of claim 14, wherein the porosity is less than twenty percent.

16. The wheel and brake assembly of claim 14, wherein the first anodized metal oxide layer has a thickness greater than twenty micrometers.

17. The wheel and brake assembly of claim 16, wherein the thickness is greater than fifty micrometers.

18. The wheel and brake assembly of claim 16, wherein the first anodized metal oxide layer has a thermal resistance greater than one-half degree Kelvin per Watt.

19. The wheel and brake assembly of claim 18, wherein the thermal resistance is greater than two degrees Kelvin per Watt.

* * * * *